(12) United States Patent
Schmidberger

(10) Patent No.: US 7,339,951 B2
(45) Date of Patent: Mar. 4, 2008

(54) TRANSMITTER AND METHOD FOR BANDWIDTH ALLOCATION

(75) Inventor: Elmar Schmidberger, Stuttgart (DE)

(73) Assignee: Alcatel, Paris (FR)

( * ) Notice: Subject to any disclaimer, the term of this patent is extended or adjusted under 35 U.S.C. 154(b) by 761 days.

(21) Appl. No.: 10/695,816

(22) Filed: Oct. 30, 2003

(65) Prior Publication Data

US 2004/0090956 A1 May 13, 2004

(30) Foreign Application Priority Data

Nov. 8, 2002 (EP) .................................. 02360306

(51) Int. Cl.
*H04J 3/16* (2006.01)
*H04L 12/56* (2006.01)

(52) U.S. Cl. ....................... 370/468; 370/516
(58) Field of Classification Search ................ 370/468, 370/516

See application file for complete search history.

(56) References Cited

U.S. PATENT DOCUMENTS 5,432,790 A 7/1995 Hluchyj et al.
6,097,700 A 8/2000 Thornberg et al.
7,006,530 B2 * 2/2006 Spinar et al. ................ 370/468
2007/0014296 A1 * 1/2007 Ryu et al. ................ 370/395.4

FOREIGN PATENT DOCUMENTS

GB 2 343 589 A 5/2000
WO WO 02 05453 A 1/2002

OTHER PUBLICATIONS

IEEE P802.16/D5-2001, IEEE Draft Standard for Local and Metropolitan Area Networks—part 16: "Air Interface for Fixed Broadband Wireless Access Systems", pp. 1-355.

* cited by examiner

*Primary Examiner*—Melvin Marcelo
(74) *Attorney, Agent, or Firm*—Sughrue Mion, PLLC

(57) ABSTRACT

The invention concerns a method for allocating bandwidth on demand to a constant bit rate connection (63 to 65) in a wireless MAN access network, in particular in a LMDS access network, as well as a transmitter (20) and a subscriber station (2) for such a network. The transmitter (20) sends data packets to the receiver (1); the data packets comprise a parameter indicating whether additional bandwidth is required for jitter compensation. Additional bandwidth is allocated to the connection (63 to 65) based on said parameter. The transmitter (20) set this parameter based on the time data has spent in a transmit queue assigned to the constant bit rate connection (63 to 65) at the transmitter (20).

13 Claims, 2 Drawing Sheets

TRANSMITTER AND METHOD FOR BANDWIDTH ALLOCATION

The invention is based on a priority application EP 02 360 306.1 which is hereby incorporated by reference.

FIELD OF THE INVENTION

The present invention relates to a method for allocating bandwidth on-demand to a constant bit rate connection in a wireless MAN access network, in particular in a LMDS access network, a transmitter for wireless MAN access networks, in particular for LMDS access networks, where bandwidth is allocated on-demand to one or several constant bit rate connections, and to a subscriber station for wireless MAN access networks.

BACKGROUND OF THE INVENTION

In LMDS systems (LMDS=Local Multipoint Distribution Service), a field in the grant management sub-header is used to pass status information from the subscriber station to the base station. This status information regards the state of the unsolicited grant service flow.

The unsolicited grant service is designed to support real-time service flows that generate fixed size data packets on periodic bases, such as D1/E1 and voice over IP without silence suppression. The service offers fixed size grants on real-time periodic bases, which eliminates the overhead and latency of subscriber service requests and ensures that grants are variable to meet the flows real time needs.

The most significant bit of the grant management sub-header is the slip indicator bit. The subscriber station shall set this flag once it detects that this service flow has exceeded it's transmit queue depth. Once the subscriber station detects that the service flows transmit queue is back within limits, it shall clear the slip indicator flag.

The flag allows the base station to provide for long term compensation of conditions such as lost maps or clock rate mismatches by issuing additional grants. The base station does not allocate more bandwidth than the maximum sustained traffic rate parameter of the active quality of service parameters, excluding the case when the slip indicator bit of the grant management sub-header is set. In this case, the base station may grant up to 1% additional bandwidth for clock rate mismatch compensation.

It is the object of the present invention to improve constant bit rate services provided in wireless MAN access networks, in particular in LMDS access networks (MAN=Metropolitan Area Network).

SUMMARY OF THE INVENTION

The object of the present invention is achieved by a method for allocating bandwidth on-demand to a constant bit rate connection in a wireless MAN access network, in particular in a LMDS access network, said method comprising the steps of: sending from a transmitter a data packet to a receiver, the data packet comprises a parameter indicating whether additional bandwidth is required for jitter compensation; allocating additional bandwidth to the connection based on said parameter; and setting said parameter based on the time data has spent in a transmit queue assigned to the connection at the transmitter. The object of the present invention is further achieved by a transmitter for wireless MAN access networks, in particular for LMDS access networks, where the bandwidth is allocated on-demand to one or several constant bit rate connections, the transmitter comprising: a connection control unit for generating data packets assigned to the connection and sent to a receiver, the generated data packets comprise a parameter indicating whether additional bandwidth is required for jitter compensation to request allocation of additional bandwidth to the connection based on said parameter; and a parameter control unit for setting said parameter based on the time data have spent in the transmit queue assigned to the connection at the transmitter. The object of the present invention is further achieved by a subscriber station for wireless MAN access networks, in particular for LMDS access networks, the subscriber station comprises such kind of transmitter.

Several advantages are achieved by the present invention:

The invention makes it possible to decrease drastically the end-to-end delays of constant bit rate connections. This causes better quality of service performance.

Further, the invention reduces the delay time data spent in transmit queues, independent on the queue fill level.

Therefore, the present invention overcomes following disadvantages of existing solutions: According to existing solutions, the bandwidth is only increased, if some data remain in the queue when data transfer is finalized. These remaining data has to wait for the next grant. Therefore, the delay of these packets is in the range of the grant period. The grant period itself is a multiple of the frame length and may vary, too. Further, to get the control loop working, the queue can not be empty.

Further, the present invention can be easily implemented into existing system. No changes have to be performed in the air interface specification. Further, the receiver side has not to be changed. Consequently, big improvements can be reached by low implementation effort.

Further advantages are achieved by the embodiments indicated by the dependent claims.

According to a prefer embodiment of the invention, fixed size grants are allocated at periodic intervals to the connections, wherein a grant includes several packets. Simulation results show that substantial improvements of delay times are achievable for such constellations.

It is possible that the parameter control unit sets said parameter, if data have spent a time longer than a predefined threshold delay in the transmit queue.

But, it is also possible that the parameter control unit calculates packet delay times, applies a PI filter (PI=Proportional Integral) on packet delay times and sets said parameter, if the output value of the PI filter exceeds a predefined threshold. This approach makes it possible to achieve further improvements of delay time. Due to the I-part of the PI filter, the control loop is better adaptable to the characteristics of LMDS transmission systems.

Further improvements are achievable by using the average delay time of the packets of a grant as input value for the PI filter.

According to a prefer embodiment of the invention, the parameter control unit performs parameter setting calculations for all packets of a grant. Thereby, it is not necessary to determine the last packet of the grant. This helps to save additional investments in such kind of recognition logic.

But, it is also possible to perform parameter setting calculation only for the last packet of the grant which helps to saves processing time.

According to a preferred embodiment of the invention, the parameter control unit assigns a time-stamp to each packet inserted in a transmit queue, evaluates the time-stamp when transmitting the corresponding packets to the receiver and calculates packet delay times based on said evaluation. This allows an efficient and cost-saving implementation of the invention.

These as well as other features and advantages of the invention will be better appreciated by reading the following detailed description of presently preferred exemplary embodiments taken in conjunction with accompanying drawings of which:

BRIEF OF THE INVENTION

DETAILED DESCRIPTION OF THE INVENTION

Figure 1:
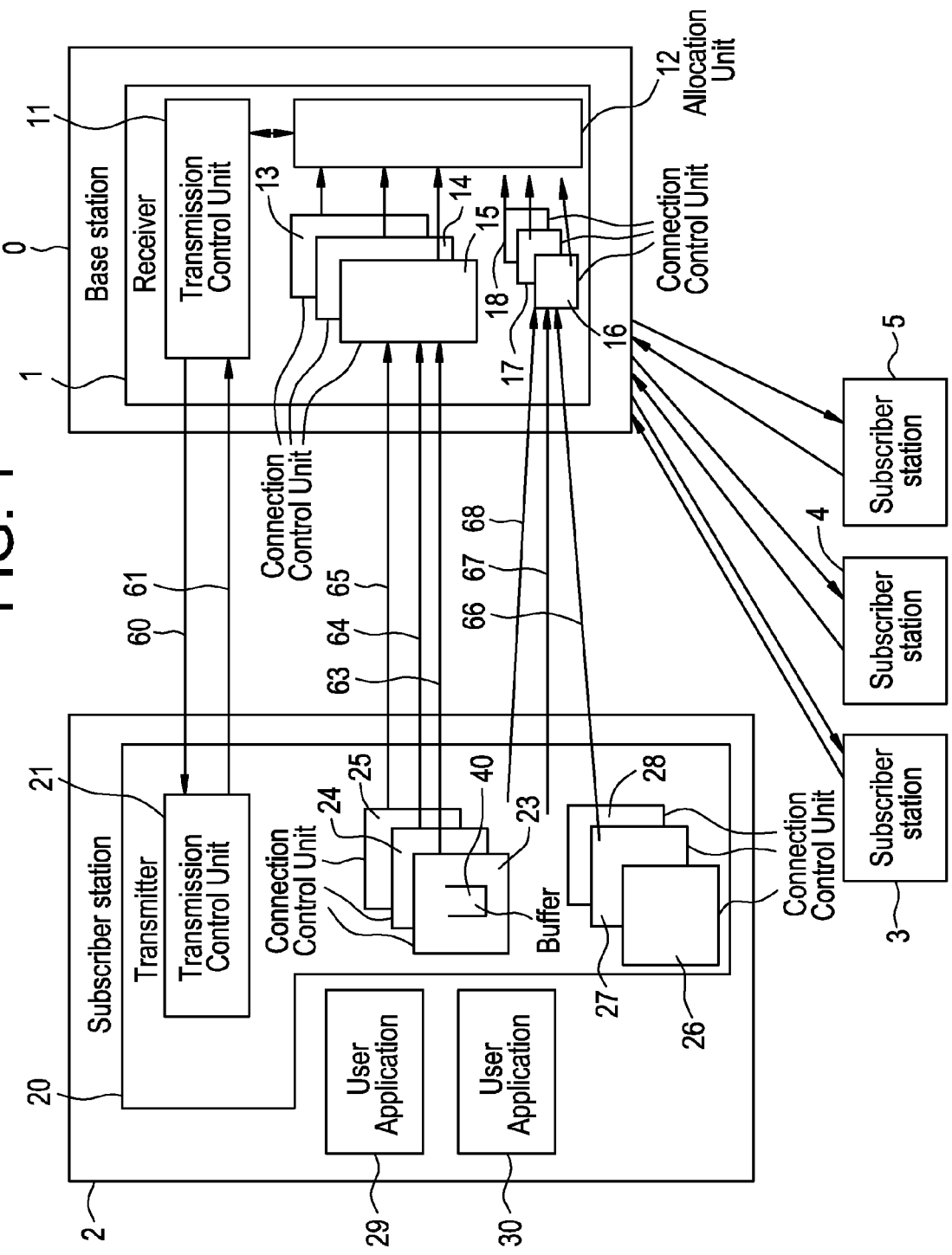
FIG. 1 is a block diagram which shows a communication system with several subscriber stations and one base station.

FIG. 1 shows a communication system. This communication system is a communication system according to IEE802.16. But, it is also possible that the communication system is any other kind of wireless MAN access network system. For example, the system of FIG. 1 is a communication system according to ETSI BRAN.

The communication system of FIG. 1 has some subscriber stations 2 to 5 and a base station 0 with a receiver 1. Data are exchanged between the subscriber stations 2 to 5 and the base station 1 via an air interface. Consequently, the base station 0 and the subscriber stations 2 to 5 utilize a shared medium which requires a mechanism to efficiently share it. The down-link from the base station to the subscriber stations operates on point-to-multipoint bases. Within a given frequency channel and antenna sector all stations receive the same transmission. The base station is the only transmitter operating in this direction, so it transmits without having to coordinate with other stations. In the other directions, the user stations 2 to 5 share the up-link to the base station on a demand bases. Depending on the class of service utilized, the subscriber stations may be issued rights to transmit.

The details of the subscriber stations 2 to 5 are described in the following by hand of the subscriber station 2.

The subscriber station 2 is formed by a terminal which comprises an electronic circuit with one or several microprocessors and with several software programs executed by these microprocessors. But, it is also possible that the electronic circuit is a pure hardware implementation. Further, it is possible that the subscriber station 2 is formed by one or several interconnected computer systems which comprise peripheral units enabling the communication over the air interface.

Therefore, the functionality of the subscriber station 2 is at least party provided by the execution of software programs by the hardware platform of the subscriber station 2.

The subscriber station 2 comprises several user applications 29 and 30 and a transmitter 20. Further, the subscriber station 21 may in addition comprise a receiver adapted as the receiver 1 of the base station 1.

The user applications 29 and 30 are application programs, which request different kind of communication services from the transmitter 20. The requested services may defer with respect to delay and bandwidth requirements of the user applications 29 and 30.

The transmitter 20 may be formed by a pure hardware implemented electronic circuit. But, it is also possible that at least a part of the functionalities of the transmitter 20 is provided by software programs executed by a microprocessor.

From the functional point of view, the transmitter 20 comprises a transmission control unit 21 and several connection control units 23 to 28.

The receiver 1 of the base station 0 is formed by an electronics circuit comprising one or several microprocessors. From the functional point of view it has a transmission control unit 11, an allocation unit 12 and several connection control units 13 to 18.

The communication between the transmitter 20 and the receiver 1 is connection oriented. For the purpose of mapping data communications to services and associating varying levels of quality of service, all data communications are handled in the context of a connection.

The transmission control units 21 and 11 are responsible for connection establishment and assignment of quality of service parameters to connections.

Several connections 60 to 61 are defined between the transmission control units 21 and 11 to allow quality of service management. After registration of a subscriber station, connections are associated with service flows to provide a reference against which to request bandwidth. Additionally, new connections may be established when a user application request changes. Connections between the transmitter 20 and the receiver 1 are created and terminated by the exchange of connection create and connection terminate messages between the transmission control units 21 and 11. Several types of communication service types may be assigned to connections, for example, unsolicited grant service, real-time polling service, non-real-time polling service and best effort service.

Each of the connection control units 23 to 28 and 13 to 18 performs functions for one specific connection defined between the transmitter 20 and the receiver 1. The connection control units 23 and 13, 24 and 14, and 25 and 15 perform functions for connections 63, 64 and 65, respectively. The control units 26 and 16, 27 and 17, and 28 and 18 perform functions for connections 60, 67 and 68, respectively.

The connections 63, 64 and 65 are constant bit rate connections. In additional to this general service type, each of these connections is specified by individual parameters specifying the grant size, the normal grant interval, the tolerated grant jitter and the request transmission policy. These connections offers fixed size grants on a real-time periodic bases which eliminates the overhead and latency of bandwidth request and ensures that grants are available to meet the flows real-time needs.

The connections 66, 67 and 68 are variable bit rate connections based on a polling service. The bandwidth allocation policy applied to these connections is designed to support real-time service flows that gant variable size data packets on a periodic bases such as MPEG video, but also to support non real-time service flows said require variable size data grant burst types on a regular bases such as high bandwidth FTP. The communication service provided by these channels offers unicast polls on regular bases which ensure that flows receive request opportunities even during network congestion.

The allocation unit 12 allocates the available bandwidth to the subscriber stations 2 to 5 and to the respective connections defined between the subscriber stations 2 to 5 and the base station 1. It performs a dynamic bandwidth allocation which bases on control messages exchanged between the transmission control units 21 and 11 and on control-subheaders exchanged over the data connections.

With respect to the constant bit rate connections 63 to 65, the connection control units 13 to 15 monitors a flag within the grant management sub-header of the received packets and report the status of this flag to the allocation unit 12. In the case the flag is set, the allocation unit grants up to 1% additional bandwidth to the associated constant bit rate connection.

With respect to the connections 66 to 68, the connection control units 16 to 18 monitors a field of the grant management sub-header of received packets, which indicates the size of requested bandwidth. In the case bandwidth is requested, it reports this to the allocation unit 12.

The allocation unit 12 may grant bandwidth explicitly to each connection or to all the connections belonging to one subscriber station.

The setting of the above mentioned flag in the grant management sub-header of packets transmitted from the connection control units 23 to 25 to the connection control units 13 to 15, respectively, is controlled base on the time data have spent in a transmit queue assigned to the connection at the transmitter 20.

For example, the connection control unit 40 has a transmit queue 40 used to offer the real-time traffic served by the connection 63. The time data have spent within the buffer 40 is monitored and the decision whether to set this flag is based on the monitored packet delay time.

In the following, the details of the invention are described by hand of FIG. 2.

Figure 2:
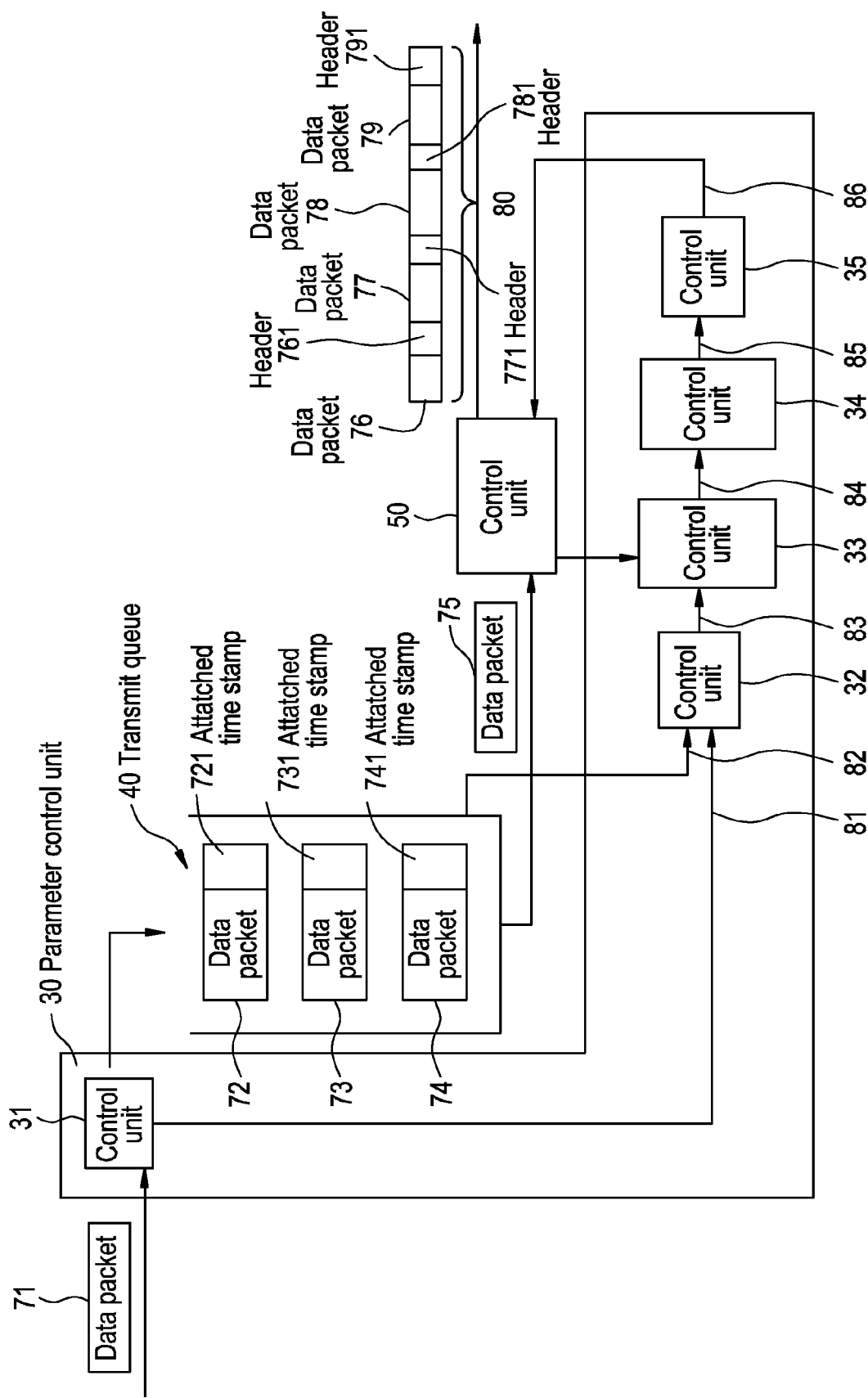
FIG. 2 is a block diagram showing a part of one of the transmitters of FIG. 1.

FIG. 2 shows a part of the connection control unit 23 which comprises the transmit queue 40, a parameter control unit 30 and a control unit 50. The parameter control unit 30 contains control units 31 to 35. The parameter control unit 30, the transmit queue 40 and the control unit 50 are preferably implemented as pure hardware implementation. But, it is also possible to implement them or a part of them as software implementation.

The connection control unit 23 receives a data packet 71 which has to be transmitted over the constant bit rate connection 63. The control unit 31 assigns a time stamp to this packet. This time stamp is a 16 bit or 32 bit value. The control unit 31 appends this value to the data packet 71. Then, it stores the data packet 71 in the transmit queue 40.

The transmit queue 40 does already contain several data packets 72 to 74. Each of these data packets comprises an attached time stamp 721, 731 and 741, respectively.

The control unit 50 serves the transmit queue 40. When a grant is issued to the connection 63, a number of packets are served by the control unit 50. The number of served packets dependents on the size of the grant.

For example, FIG. 2 shows a grant 80 including four data packets 76 to 79. When a grant of this size is issued, the control unit 50 serves four packets of the transmit queue 40. While served by the control unit 50, the time stamps are detached and signaled as signal 82 to the control unit 32.

Further, the control unit 50 generates the data packets sent to the receiver 1. It receives packets from the transmit queue 40, for example a data packet 75, and adds headers to these packets, which are necessary to transmit these data packets over the connection 63 to the connection control unit 13.

For example, it adds headers 761, 771, 781 and 791 to received data packets and generates a grant comprising the data packets 76 to 79 with the headers 761, 771, 781 and 791. Further, it sets a parameter within these headers which indicates whether additional bandwidth is required for jitter compensation. Preferably, this parameter is a one bit flag which is in the following notified as slip indicator.

The control unit 32 calculates the packet delay time of the packets served by the control unit 50.

On the one hand, it receives the signal 82 specifying the time stamps associated to served data packets. On the other hand, it receives a signal 81 containing synchronization information from the control unit 31.

For example, the control unit 31 contains a counter which is periodically increased by help of a clock signal. The control unit 31 generates a time stamp by assigning the present counter value to the data packet presently stored in the transmit queue 40. Further, it signals the present counter value as signal 81 to the control unit 32. The control unit 32 calculates the transmission delay time of a data packet by calculating the difference between the values signaled by the signals 81 and 82.

The control unit 33 calculates the average delay time of the data packets of a grant. It receives a signal 83 from the control unit 32. The signal 83 contains information about the delay times of the single packets served by the control unit 50. Further, it receives information from the control unit 50 indicating the issuing of a grant. Therefore, the control unit 33 is in a position to assign individual delay times to grants and calculate the average delay time of the packets of the grant.

But, it is also possible to send the signal 83 directly to the control unit 34 and to perform the calculations described in the following with the delay times of the single data packets as input value.

The control unit 34 is a PI filter. The I-part of the filter is, for example, implemented by help of a memory and an adder. The filter parameters assigned to the P-part and I-part of the PI filter depend on the specific implementation of the method. Simulation results show that a dominant I-part is of advantage.

The control unit 35 receives the output value of the PI filter. The control unit 35 compares this output value with a predetermined threshold. If the output value exceeds this threshold, it sends a signal 86 to the control unit 50 which requests the setting of the slip indicator.

But, it is also possible to directly feed the control unit 35 with the signal 83 or the signal 84. Accordingly, the parameter control unit sets the slip indication parameter, if data have spent a time longer than a predefined threshold delay in the transmit queue.

The parameter control unit 30 forms part of a feedback control loop controlling the time data packets spent in the transmit queue 40. The regulated parameter is the slip indicator parameter.

The invention claimed is:

1. A method for allocating bandwidth on-demand to a constant bit rate connection in a wireless MAN access network, wherein said method comprises the steps of:
   sending from a transmitter a data packet to a receiver, the data packet comprising a parameter indicating whether additional bandwidth is required for jitter compensation;
   allocating additional bandwidth to the connection based on said parameter; and
   setting said parameter based on the time data have spent in a transmit queue assigned to the constant bit rate connection at the transmitter.

2. The method for allocating bandwidth according to claim 1, wherein the method further comprises the step of allocating fixed size grants at periodic intervals to the connection, wherein a grant includes several packets.

3. A transmitter for wireless MAN access networks, where bandwidth is allocated on-demand to one or several constant bit rate connections, wherein the transmitter comprises:
- a connection control unit for generating data packets assigned to the connection and sent to a receiver, the generated data packets comprising a parameter indicating whether additional bandwidth is required for jitter compensation to request the allocation of additional bandwidth to the connection based on said parameter; and
- a parameter control unit for setting said parameter based on the time data have spent in a transmit queue assigned to the constant bit rate connection at the transmitter.

4. The transmitter according to claim 3, wherein the parameter control unit is adapted to set said parameter, if data have spent a time longer than a predefined threshold delay in the transmit queue.

5. The transmitter according to claim 3, wherein the parameter control unit is adapted for calculating packet delay times; applying a PI filter on packet delay times; and setting said parameter, if the output value of the PI filter exceeds a predefined threshold.

6. The transmitter according to claim 5, wherein the parameter control unit is adapted to use the average delay time of the packets of a grant as an input value for the PI filter.

7. The transmitter according to claim 3, wherein the parameter control unit is adapted to perform parameter setting calculations for all packets of a grant.

8. The transmitter according to claim 3, wherein the parameter control unit is adapted to perform parameter setting calculations only for the last packet of a grant.

9. The transmitter according to claim 3, wherein the parameter control unit is adapted for assigning a time-stamp to each packet inserted in the transmit queue; evaluating the time-stamps when transmitting the corresponding packets to the receiver; and calculating packet delay times based on said evaluation.

10. Subscriber station for a wireless MAN access network, wherein the subscriber station comprising the transmitter according to claim 3.

11. The method for allocating bandwidth according to claim 1, wherein the wireless MAN access network is a LMDS access network.

12. The transmitter according to claim 3, wherein the wireless MAN access network is a LMDS access network.

13. The subscriber station according to claim 10, wherein the wireless MAN access network is a LMDS access network.

* * * * *